United States Patent [19]
Day

[11] Patent Number: 5,198,809
[45] Date of Patent: Mar. 30, 1993

[54] HARD WIRED PROGRAMMABLE CONTROLLER ESPECIALLY FOR HEATING VENTILATING AND AIR CONDITIONING (HVAC SYSTEMS)

[75] Inventor: James L. Day, Victor, N.Y.

[73] Assignee: James L. Day Co. Inc., Victor, N.Y.

[21] Appl. No.: 658,818

[22] Filed: Feb. 22, 1991

[51] Int. Cl.$^5$ .............................................. H02J 3/14
[52] U.S. Cl. .................. 340/825.160; 340/825.06; 340/825.83; 307/39; 307/139
[58] Field of Search ............... 340/825.16, 825.06, 340/825.83, 825.8; 307/34, 139, 465

[56] References Cited

U.S. PATENT DOCUMENTS

| | | | |
|---|---|---|---|
| 3,622,990 | 11/1971 | Lerch | 340/825.83 |
| 4,032,894 | 6/1977 | Williams | 340/825.83 |
| 4,180,744 | 12/1979 | Helwig, Jr. | 307/39 |
| 4,307,379 | 12/1981 | Wyland | 340/835.83 |
| 4,766,569 | 8/1988 | Turner et al. | 340/825.83 |
| 4,908,498 | 3/1990 | Kivelä | 307/39 |

Primary Examiner—Donald J. Yusko
Assistant Examiner—Brian Zimmerman
Attorney, Agent, or Firm—Martin Lukacher

[57] ABSTRACT

Inputs are programmably interfaced and interlocked with output so that the state of the outputs and the operation of equipment connected thereto depends on the hierarchy or priority (control strategy) which is programmed into the controller. The inputs may be contacts (switch closures) of switches which are thrown to operate HVAC units and high or low limit sensors such as thermostats and pressure sensors of an HVAC system. The outputs operate the motor controls of motors which drive the blowers, fans, pumps, dampers and the like of the HVAC system for environmental control and the safety both of the occupants of a facility and the HVAC equipment therein. The programmable controller has an on-matrix and an off-matrix of switch points which are arranged in columns and rows. Each row of switch points is connected to an input circuit. The columns of switch points in the on-matrix are connected to the outputs via control logic to which each column of switch points is connected. Each input is connected through control logic which is capable of reversing the logic state presented by the input so that a normally asserted input (e.g. a normally closed contact of a low limit sensor) is asserted when the contact opens.

17 Claims, 10 Drawing Sheets

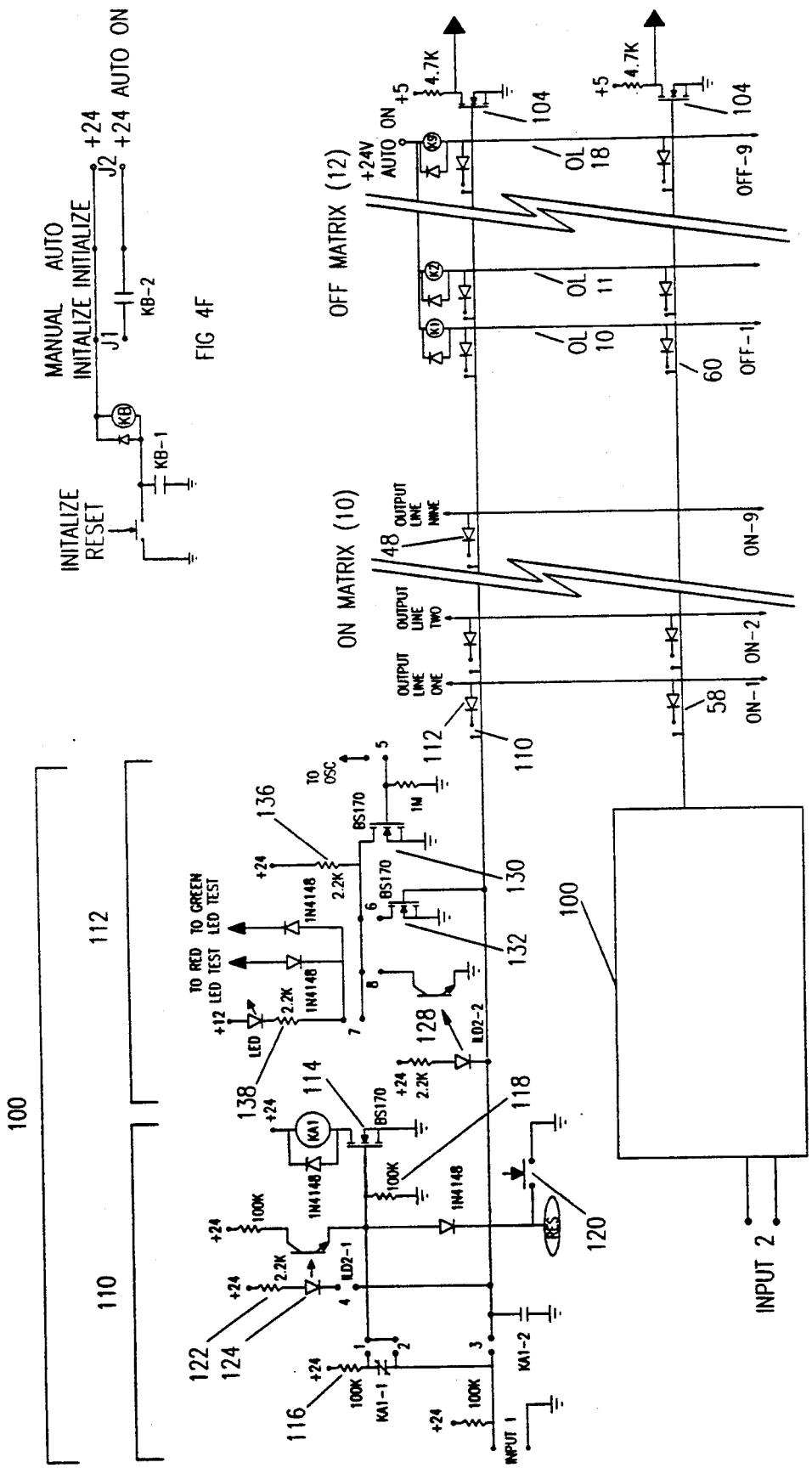

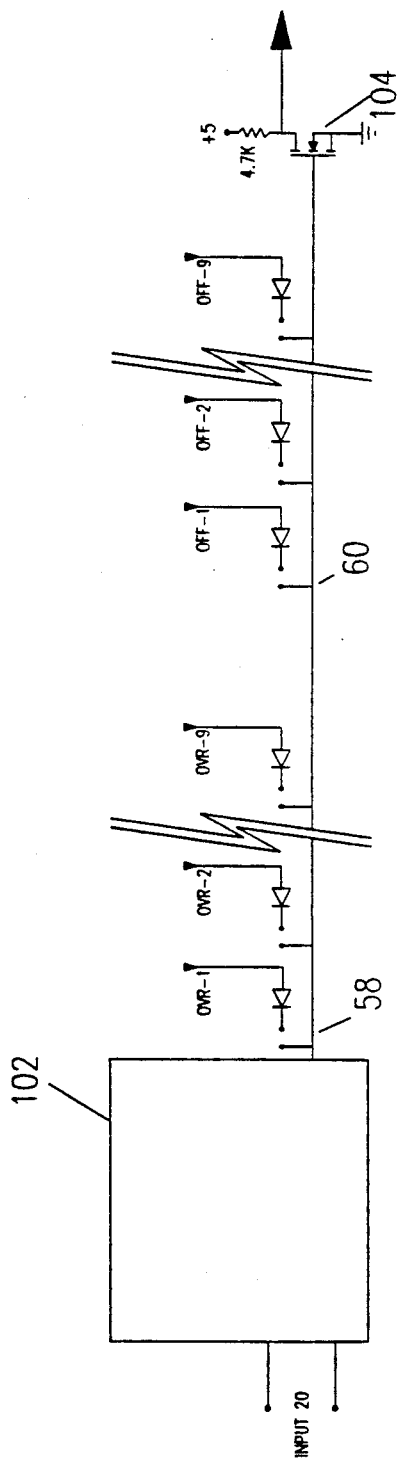
FIG 4C
FIG 4D
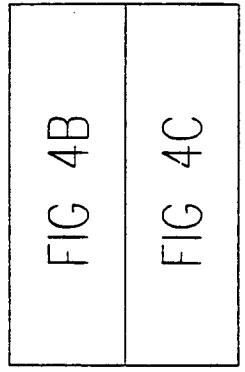

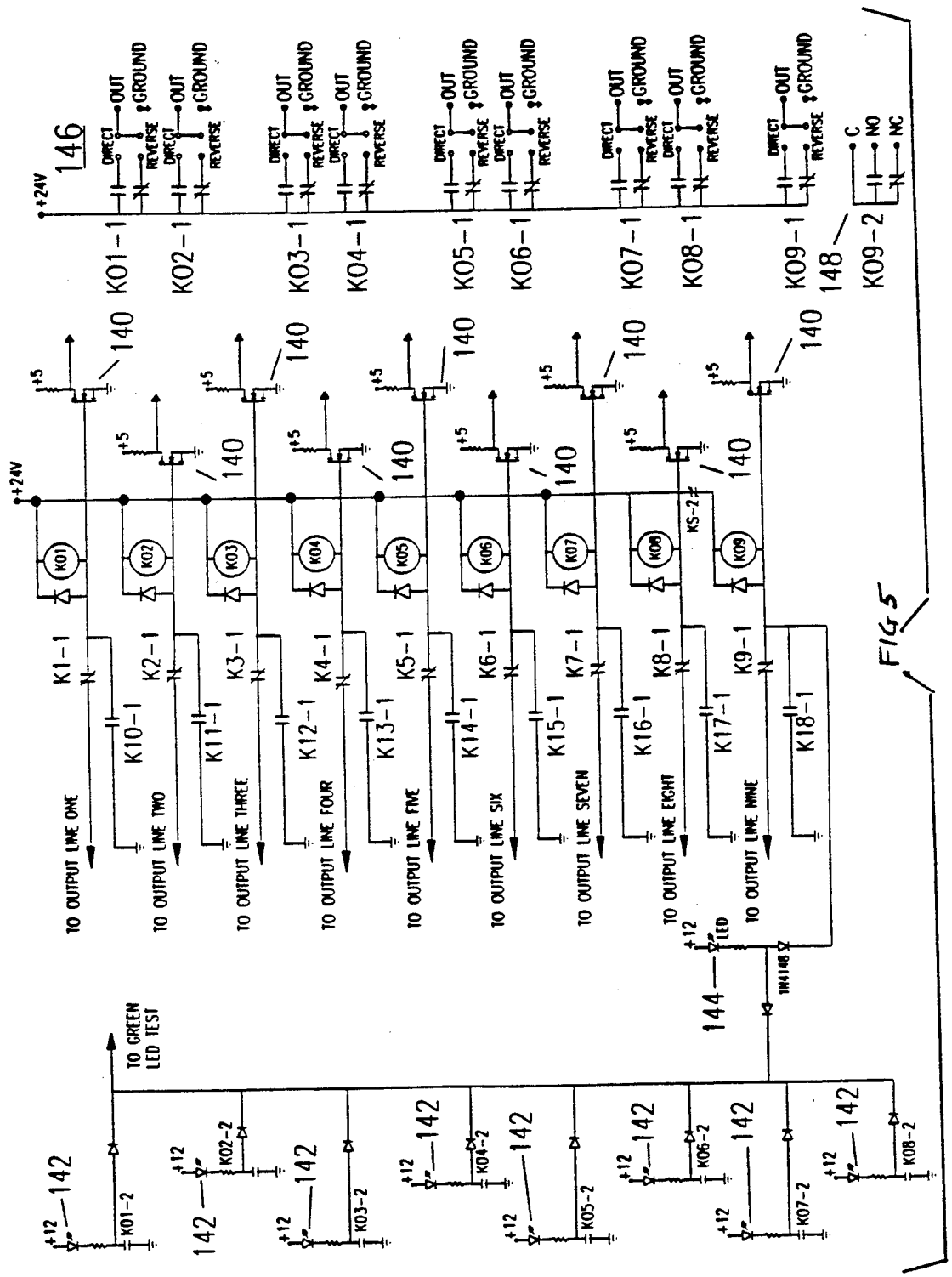

HARD WIRED PROGRAMMABLE CONTROLLER ESPECIALLY FOR HEATING VENTILATING AND AIR CONDITIONING (HVAC SYSTEMS)

The present invention relates to programmable controller or interface apparatus for interfacing inputs and outputs to effect selected control strategies, and particularly to a hard wired programmable controller where the programming of the control strategies is obtained by manually actuable switches arranged in matrixes which interlock the outputs and the inputs to provide different functions and priorities of operation.

The invention is especially suitable for use in HVAC systems for programming the functionality and priority accorded to control inputs such as blower, fan damper and pump stop/start switches and sensors such as thermostats and the motors of the fans, blowers, pumps and dampers of the system. The invention is also applicable in providing hard wired programmable control for processing systems by controlling the pumps, boilers, chillers, heaters, agitators, mixers and the like which carry out the process.

Programmable control of HVAC systems generally involves the use of a digital control computer having software programs for executing the control strategy specified by the HVAC system designer. By control strategy is meant which input, whether a switch thrown by the operator or a sensor which indicates operating conditions or positions of mechanisms in the HVAC system, turns the various outputs (air handling blowers and dampers, pumps and compressors) on or off and the priority given to the various input; for example, whether one or more inputs will turn a fan on and another input will turn that fan off, and whether the off function has priority over the on function. Because digital computers are subject to software errors and component failures, control of safety related conditions is not left to the computer but rather is relegated to overriding relay logic circuits. These circuits are not programmable and must be designed for specific HVAC systems on a case-by-case basis.

It is the principal feature of this invention to provide programmability both as to functionality and priority, in the way inputs are interfaced and interlocked with outputs in a hard wired controller using relays. Then all output functions of an HVAC system including override and priority capability, in response to various inputs, may be programmed in accordance with the control strategy specified for the system.

The hard-wired controller of the invention is almost universally applicable to all HVAC systems regardless of the complement of control switches, motor controls (motor starters) which the HVAC system employs up to a maximum number of inputs and outputs for which the hard wired programmable controller is equipped. It is a feature of the invention therefore to provide a universal controller which is hard wired and programmable to provide selected command and control functions with the existing operating controls and sensors already present in the system to be controlled and irrespective of the logical relationship of their operation to the desired control function; for example, whether an open switch contact or a closed switch contact is supposed to provide the same control function. Thus, a hard wired programmable controller in accordance with the invention is capable of handling different configurations of operating controls and sensors (inputs) and of control devices, even if the ports of a computer controller are the outputs, thereby providing the system designer with the flexibility to handle all or almost all configurations of input and output devices of an HVAC system.

It is a feature of the invention to provide a hard wired programmable controller which can replace computer controllers for many applications, particularly in a majority of HVAC or environmental control systems.

It is another feature of the invention to provide a hard wired controller wherein the programming of logical command and control operations is visible to the operator and understandable to typical operating personnel, such as the operating engineers responsible for the operation and maintenance of HVAC systems, and who do not have special computer programming skills.

It is another feature of the invention to provide a hard wired programmable controller without complex electronic circuits characterizing electronic digital computers such that the program cannot be changed or physically altered without such alteration being visible, and which is reliable in that failures due to programming errors and component failures common in electronic digital computers are thereby substantially eliminated.

It is a further feature of the invention to provide a hard wired programmable controller which can operate with various inputs and has internal circuits for latching of inputs and for resetting the controller automatically or through an external action, such as pressing a reset switch or the receipt of a reset signal from a digital control computer.

It is still a further feature of the invention to provide a hard wired programmable controller which is operable at low voltage so as to reduce electrical shock hazards for enhanced safety of operation, and which the voltage may be supplied from more than one source for enhanced reliability and yet to be operative to shut down the controlled system in the event of a power failure instead of continuing to command the system to operate, as in the case of digital control computers having battery backup which do not respond to power failures; the hard wired programmable controller thereby enhancing equipment safety and reducing the possibility of equipment damage.

Another feature of the invention which also enhances the ease of programming and the understanding of the program configuration in the hard wired programmable controller is in annunciators associated with each input which change color from green to red or from green to amber to show the status and safety condition of the inputs to the controller; the input being amber for a not unsafe condition, red for an unsafe condition and green for a safe condition.

It is another feature of the hard wired programmable controller of the invention that the programmer may be emulated in a digital computer and the computer used to simulate the program thereby allowing the controller logic to be certified as operational to meet the control functions specified for the HVAC system with which the controller is used. The parts of the controller which establish the program, for example, the matrixes of switch points which are manually closed to establish the program (plug boards) may be certified as operational in accordance with the specified control functions and supplied to the site where the HVAC system is installed in a substantially tamper-proof assembly.

Briefly described, a hard wired programmable controller in accordance with the invention interfaces a plurality of inputs with a plurality of outputs and has first and second matrixes, each matrix has a plurality of manually connectable switch points which are normally open and are manually closed. The switch points are arranged in rows and columns. A plurality of first output lines are connected to the switch points in the columns of the first matrix and a plurality of second output lines are connected to the switch points in the columns of the second matrix. Connections from each input extends to each row of both the first and second matrixes. The lines from the inputs are connected to selected ones of the first and second output lines depending upon whether the switch point associated (at the intersections of the input and output lines) is closed. Switching means, preferably including relay logic, are connected to the first output lines to provide connections from the inputs to the outputs unless: (a) an output line is connected to an input which then overrides (inhibits) connections between the inputs and outputs through the first matrix, thereby providing a higher level of priority to an off condition programmed by a closed contact in the second matrix than to an on position programmed by a closed contact in the first matrix; and (b) providing priority to certain inputs to operate certain outputs via the first or on matrix irrespective of whether those outputs are subject to being inhibited in the second or off matrix. Thus, there are at least three levels of priority with which the outputs are interlocked with the inputs. The first level is an on condition. The second level is an off condition which takes precedence over the on condition (for example, shutting down a chiller compressor when a freeze stat thermostat closes on sensing a low temperature limit). The system includes input logic associated with each input for reversing the logic state of the input and for latching the input, thus making the controller compatible with various types of switches and sensors; for example, which either are normally open and closed, or are alternatively normally closed and then opened in response to like conditions. The input circuits also have a tri-state optical annunciator providing illumination which switches between two of three colors thereby indicating the status of the input and whether the condition represented by the input is safe, unsafe or not unsafe, as by green, red and amber colors, respectively. The system provides for resetting of all latched inputs manually so that the input can effect an output if it resumes a safe (non-alarm condition) after being latched. The system provides a latching function so that the input cannot effect an output if it resumes a safe (non-alarm condition) after being latched. Manual resetting is provided for all latched inputs via a manual pushbutton or external connection to a remote contact for this purpose. Also circuits associated with each input and output have relay logic which provides automatic or manually actuable resetting after a power failure. All inputs and outputs are available through buffer circuits to a computer which can generate a display of the overall status of the controller.

The foregoing and other features, advantages and objects of the invention and a presently preferred embodiment thereof will become more apparent from a reading of the following description in which.

Figure 1:
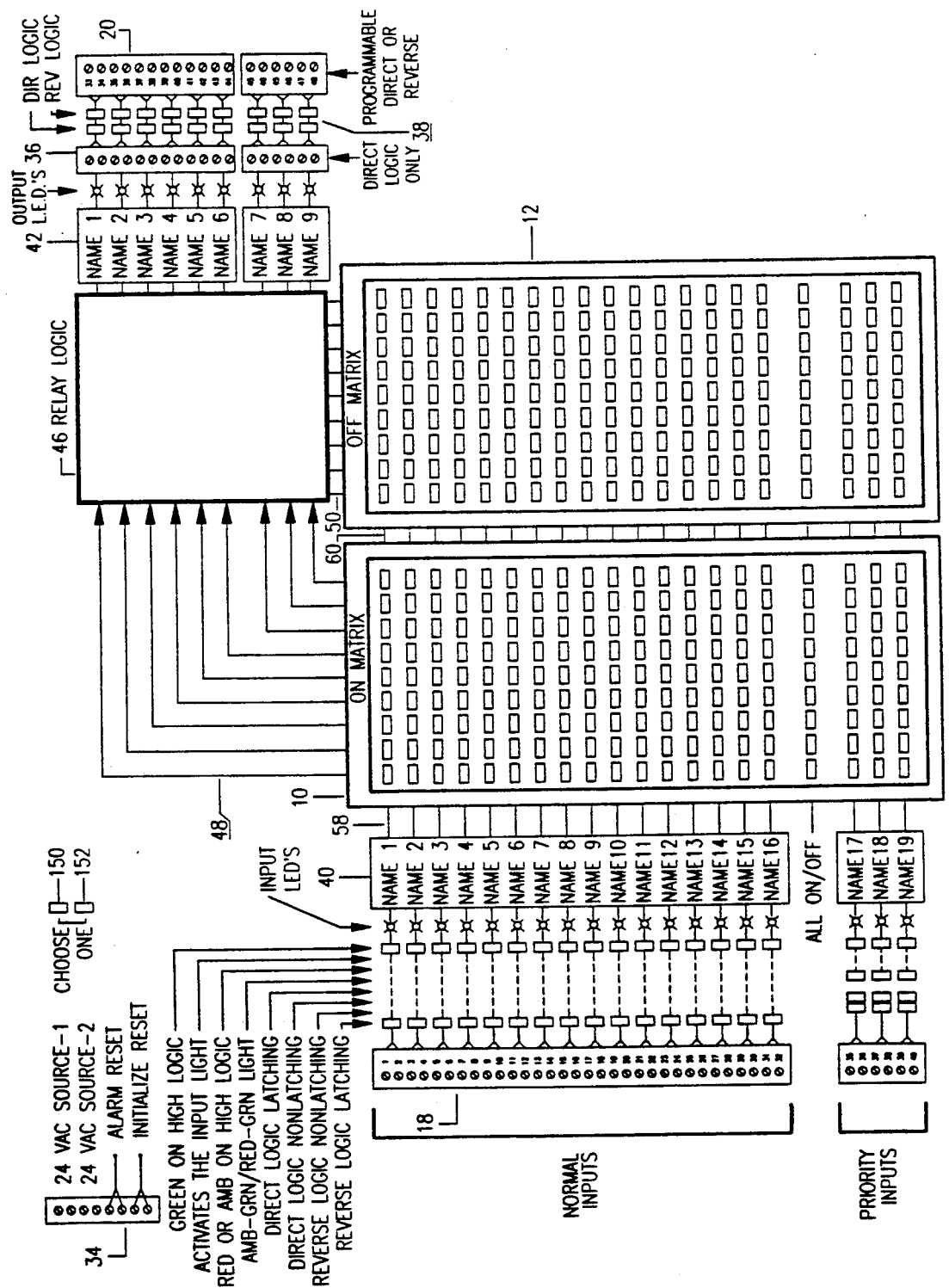
FIG. 1 is a schematic diagram of a hard wired programmable controller in accordance with the invention.
Figure 2A:
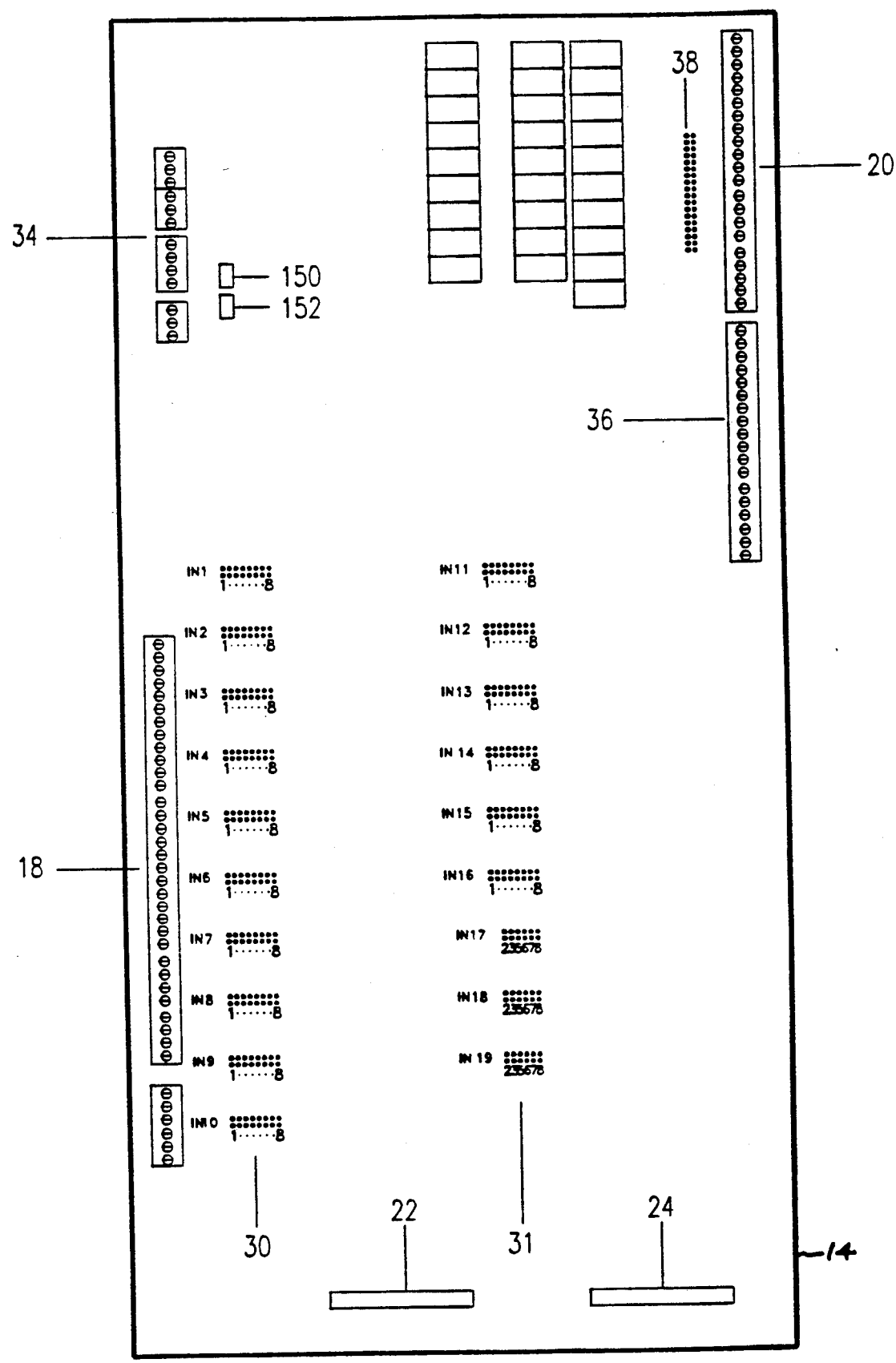
FIG. 2A, 2B & 2C are front views of the mechanical assembly of the hard wired programmable controller shown in FIG. 1, FIG. 2A showing the bottom card, FIG. 2B the top card and FIG. 2C the cards assembled.
Figure 2B:
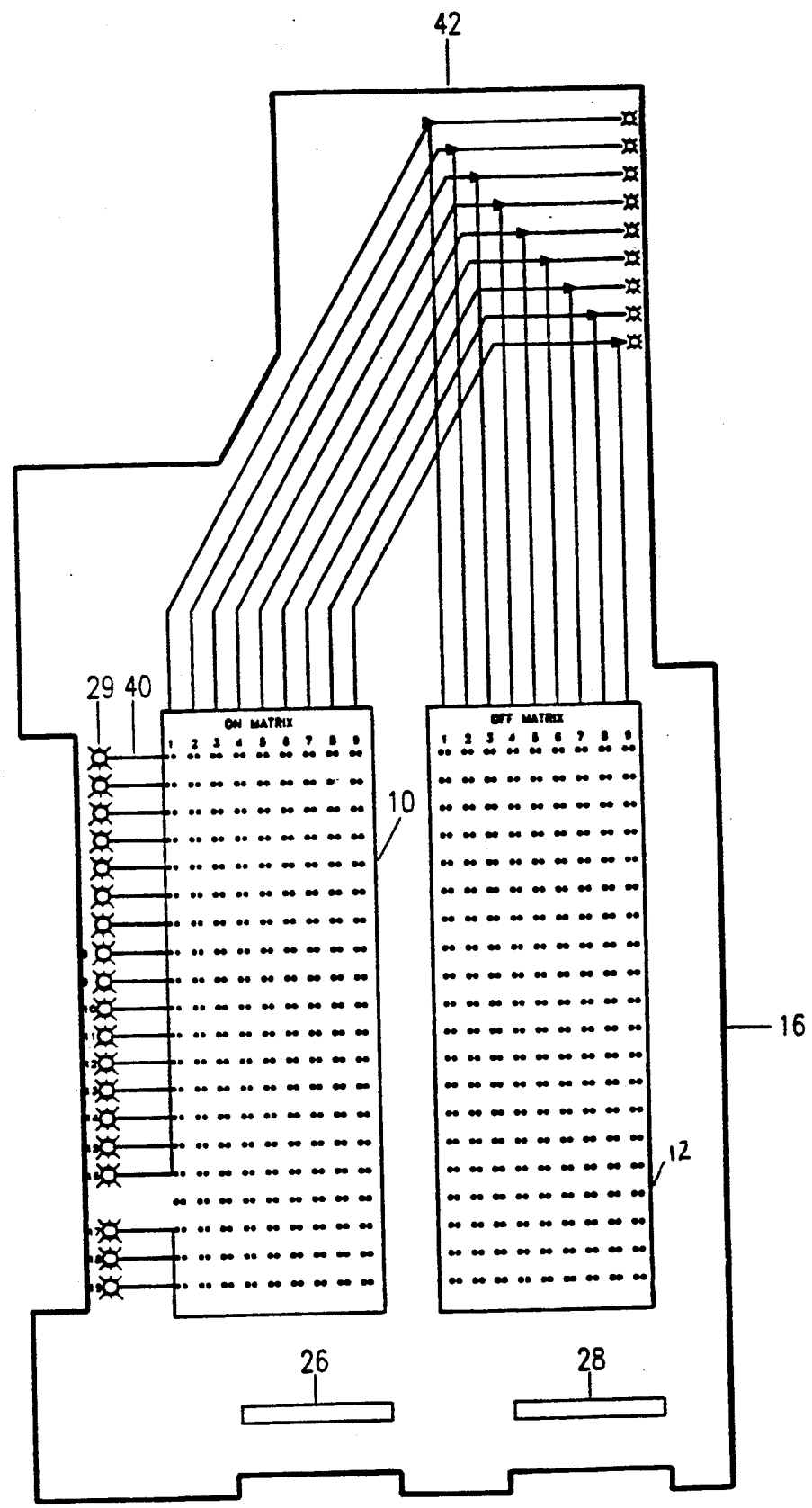
Figure 2C:
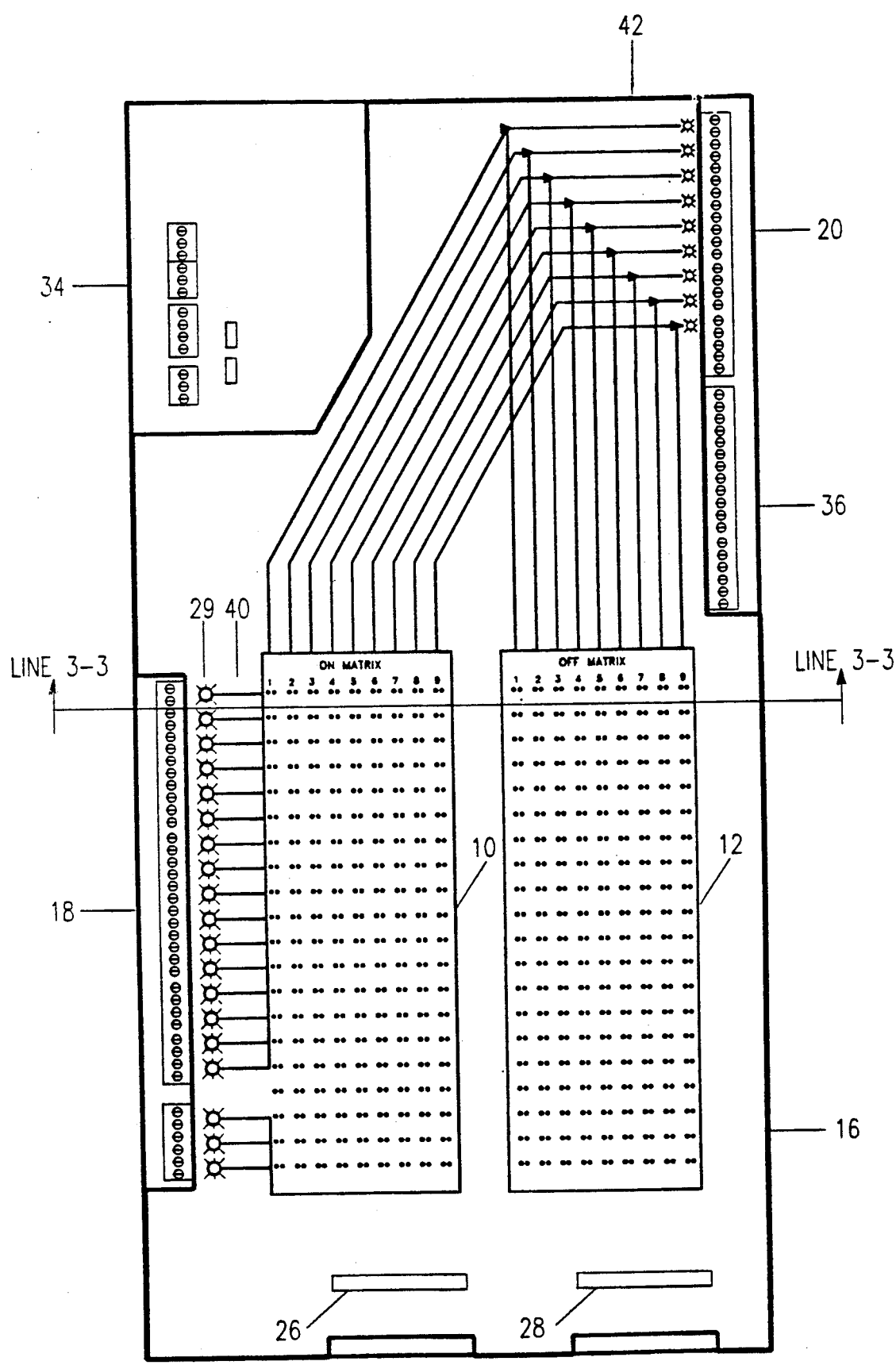
Figure 3:
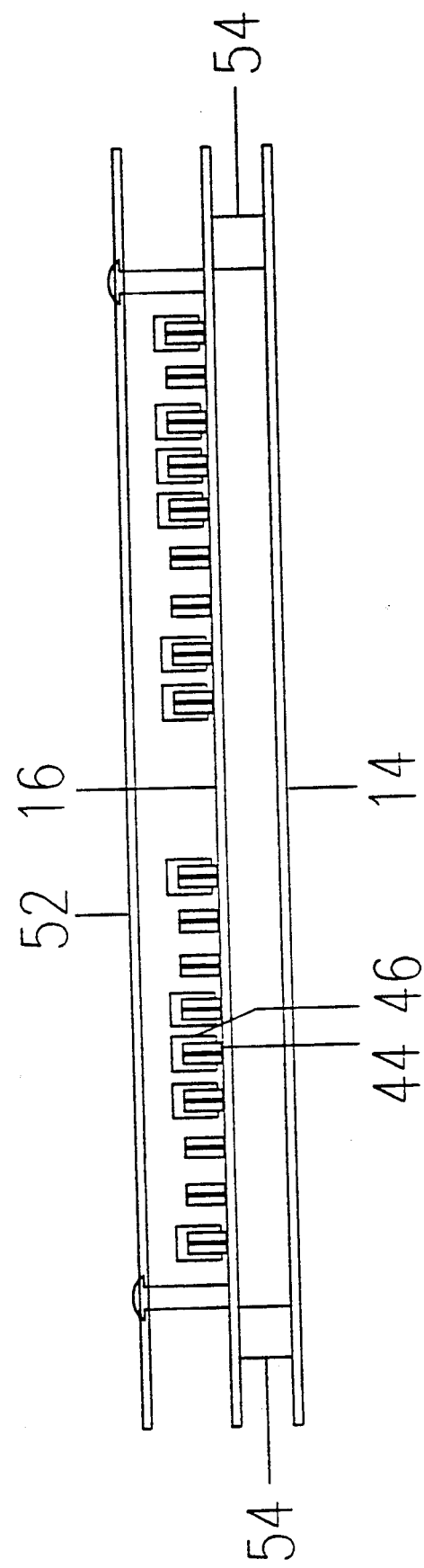
FIG. 3 is a sectional view along the line 3—3 in FIG. 2C.
Figure 6:
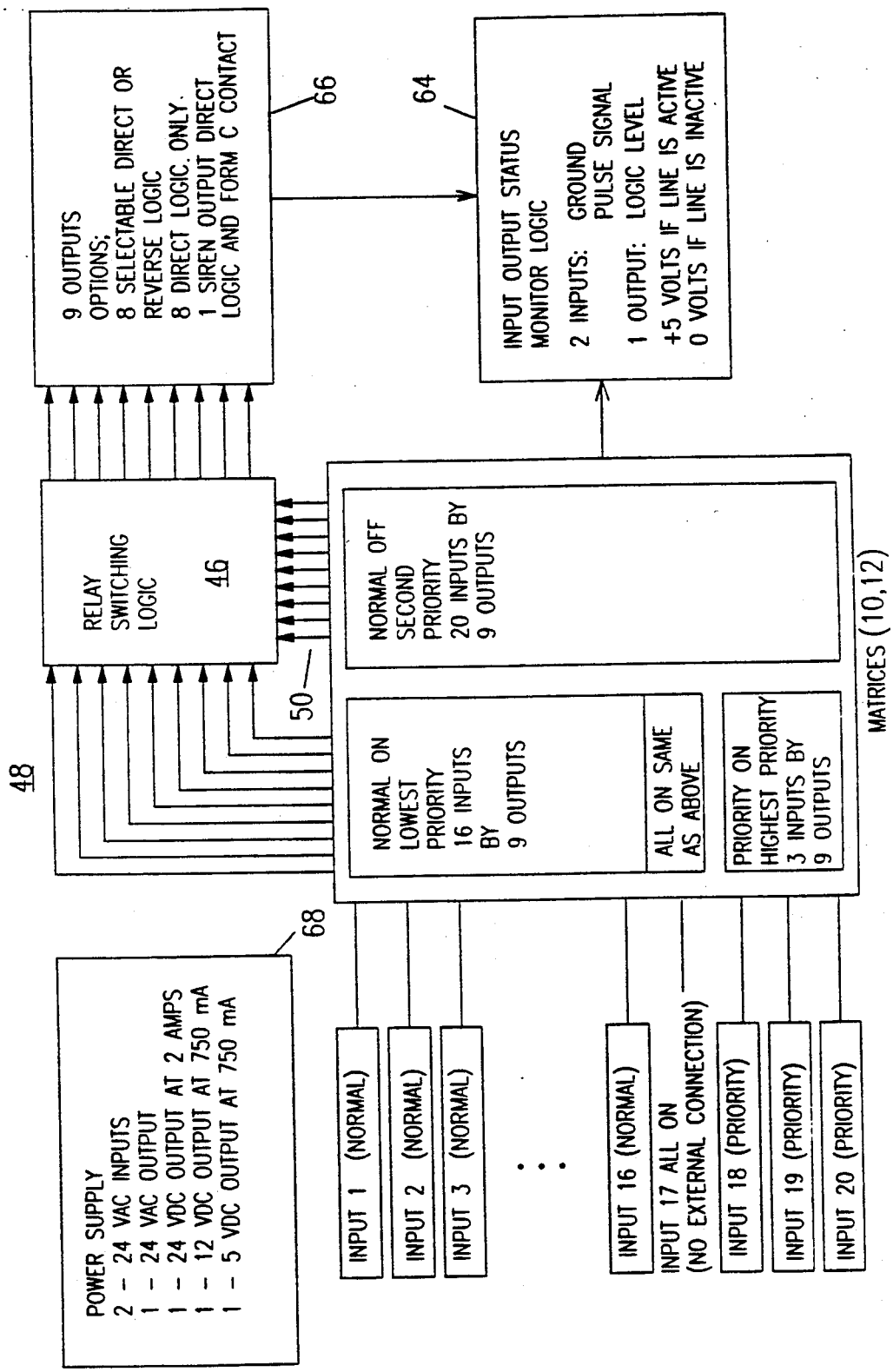

FIG. 4 A 4B, 4C, assembled as shown in FIG. 4 D, is a schematic diagram of the input circuits and the matrixes of the hard wired programmable controller shown in FIGS. 1 through 3;

FIG. 4 F is a schematic diagram of the circuit for initializing the controller after power is off or has failed;

FIG. 5 is a schematic diagram of the output circuits of the programmable controller shown in the preceding figures; and FIG. 6 is a functional block diagram of the programmable controller shown in FIGS. 4 and 5.

Referring to FIG. 1 and FIG. 6 there is shown schematically a hard wired programmable controller having twenty inputs and nine outputs. Two matrixes, namely an on matrix 10 and an off matrix 12, are mounted on a single panel 14. The matrixes may be a single board 16 on which both matrixes 10 and 12 are wired (see FIGS. 2A, 2B and 2C and 3). Terminal blocks 18 have screw down posts providing connections for the inputs. Other terminal blocks 20 have screw down posts for connections to the outputs. There are two input terminals for each of the twenty inputs except for input 17 which is the "all call" input and which is always active or asserted by being connected to ground as will be explained more fully hereinafter.

The input terminals are connectable to switches, contactors, and the contacts of sensors. For example, the first terminal may be a contact which is thrown when the AC lines are connected to an air supply or circulating fan of an HVAC system which is operated via the illustrated hard wired programmable controller. The switch connected between terminals 1 and 2 closes when a call for start from a controller is initiated. Thus, input 1 is a fan start/stop input. Input 2 may be a sensor which senses air motion or the presence of voltage from the AC lines at the fan motor. In other words, the second input could be the supply fan run indication. The third input may be obtained when terminals 5 and 6 are connected to a switch contact as, for example, a call for the return fan motor to start. The input is closed and provides a ground connection between terminals 5 and 6. Thus, the third input is the return fan start/stop input. The fourth input is provided by a connection of contacts of the return fan run sensor between terminals 7 and 8. Therefore, input 4 is the return fan indication. Input 5 may be provided by a connection between terminals 9 and 10 of the switch of a smoke detector. Thus, input 5 is active when smoke is detected. Input 6 may be provided by connecting the contacts of a sensor which indicates the condition of pressure drop access to a filter. Input 7 may be a thermostat, such as a freeze-stat, which provides contacts that are normally closed and open when the temperature reaches the low limit. The switch contacts of a smoke detector in the supply air duct may be connected to terminals 15 and 16 to provide the 8th input. A fire alarm may have switch contacts which are normally closed and open upon detection of a fire. These contacts are connected to terminals 17 and 18 and provide the 9th input. The priority inputs are 18, 19 and 20. These may be connected to override switches available to firemen or other emergency personnel so as to establish an override condition, namely purging or pressurizing of certain areas in the building served by the HVAC system. Then the fire marshall can purge or pressurize certain floors or other areas depending upon the emergency condition in order to alleviate such condition.

The outputs again have two terminal posts to which wires to output devices are screwed down. The first two terminal posts, number 33 and 34, may, for example, go to the supply fan motor starter automatic function. The next two terminals, 35 and 36 on the second output, may, for example, go to the supply fan run permissive input of the motor starter. The third output may be the return fan motor starter automatic function which is connected to terminals 37 and 38. The fourth input may be the return fan permissive control. The fifth output may be the control to the motor operating a smoke damper. The fifth input connected to posts 43 and 44 may be a preheat coil control which applies power to a preheating coil valve activator in the HVAC system. Other outputs may be connected to mixing damper motors and smoke isolation sequence of other dampers. The last output preferably has a form C contact closure to operate a master emergency alarm such as a strobe lamp circuit, a siren or the like as well as a normal output The panel 14 has plugs 22 and 24 for ribbon cables which lead to connectors 26 and 28 on the board 16. See FIGS. 2A, 2B and 2C. This panel 14 also carries a line of input switch points. Board 16 carries an input LED in array 29 for each input except the all call input. The switch points are terminals having jumpers which may be in the form of pins which make contact between the switch point terminals. Such jumper switch points are available in strips. There are a line of eight such jumper switch points for each input disposed in an array 30 and 31 of the panel 14 near the input terminal block 18. The first four of these input switch points in each input line respectively provide reverse logic with latching, reverse logic without latching, direct logic with latching and direct logic without latching. Then jumpers are inserted in switch points 3 and 4. The remaining four switch points select the color emitted by the LEDs. This color will change between normally red and green when its associated input changes state (on to off), or normally green and red when the input changes state, or from amber to green or green to amber when the state of the input changes.

Direct logic means that an active or assertive state corresponds to one state of the input and an inactive or offstate to the other. For example, in the illustrated controller an input for direct logic is active when a normally high output line is connected through the input terminals to ground. This condition can be used for fan and motor contacts and most sensors which close when the sensed condition occurs. There are other inputs which work in reverse, for example, a low limit sensor which becomes active when its switch contacts open. So as to provide the same response to an active condition reverse logic is used. In some cases, it is desirable to latch an input, particularly where the sensor which provides the input is not self-latching. The input circuit, by selecting latching through the use of a jumper, makes the input latching. The latched input is released only when a reset button is pressed. That reset is shown connected to a terminal block 34.

This terminal block 34 also has connection to an initialized reset push button and two sources of power which are suitably of low voltage so as not to impose a shock hazard; 24 volts AC being suitable. These sources may be obtained by connecting the terminal block 34 to step down transformers in the fan motor start unit of the HVAC system and in another unit, preferably the digital computer when the HVAC system is equipped with such a computer.

The above discussion of direct and reverse logic applies to the inputs. The outputs are active in different states. A direct output, for example, in the illustrated system is a logic high for active and logic low for inactive. It may be desirable to take the outputs from a separate terminal block 36, through an output LED, to indicate whether the outputs are high. This terminal block 36 is connected to the output terminal block 20 but through a pair of switch points 38, one of which is closed by a jumper to provide direct logic while the other one is closed to provide reverse logic. In other words, terminal block 20 outputs are programmable as direct or reverse type outputs, but output terminal block 36 is connected to terminal block 20 as a direct output only. The ability to select direct or reverse logic on the inputs and the outputs together with the ability to make any input latching, makes the programmable controller provided by the invention universally applicable to almost every complement of input and output devices, and particularly such input and output devices as are found in HVAC systems.

In addition to the input and output LEDs, there is space on the board 16 for labels (input labels 40 and output labels 42) on which the names or locations of the inputs and outputs are marked.

FIGS. 2B and 3 illustrate a few exemplary switch points 44; some with jumpers 46 in place to close the switch points. The program of the controller is established by the switch points on the on and off matrixes and the inputs and outputs. The input annunciation strategy is established by the switch points at the inputs. These switch points which in every case may be strips of Berg connectors which are available from AMP Corporation, for example, their part no. 531220-2 are normally open and are closed to establish the program.

The various connections of inputs and outputs which are desired and the various states of the inputs and the colors of the input LEDs, may be emulated on a suitably programmed digital computer. The digital computer provides a listing of which switch points in the inputs and outputs and on the on matrix 10 and off matrix 12 which are closed to obtain the control strategy which is specified by the HVAC or other process designer. The HVAC specification will indicate which inputs have lowest priority, next priority and highest priority. In the illustrated system, the inputs which are connected to the on matrix to the outputs are connected thereto through relay logic 46 providing switching means. (See also FIG. 6). This logic is controlled by the priority inputs from the on matrix and by the off matrix. The arrangement of the switch points on the on and off matrixes and the relay logic 46 causes lowest priority to be given to signals on the output lines 48 from the on matrix. These output lines have through connections to the outputs in this embodiment of the invention as will become more apparent from FIG. 5. The off matrix has output lines 50 which operate to inhibit any on condition which might be established on the output lines 48 of the on matrix. They still further override is obtained by connections from the on matrix priority inputs when the output lines to the priority inputs are asserted. Then the priority inputs override both any on or any off program hard wired by the arrangement of jumpers on the on and off matrixes 10 and 12.

In order to prevent tampering with the programming such as the removal or replacement whether advertent or inadvertent of any jumpers on the switch points, a cover 52 (FIG. 3) may be arranged to either seal or otherwise deny access to the switch points. The panel 16 is therefore covered. The logic is, however, visible through the cover 52 which may of transparent material. The assembly of the panel 16 and the switch points and lamps (LEDs) thereon provides an assembly which may be attached, as by posts 54, to the panel 14 and connected to the panel 14 via the ribbon connectors 26 and 28 on the board 16 and the connectors 22 and 24 on the panel 14. The operation of the programmed board 16 may be verified in a test set designed for such purpose and the board certified with respect to its operation. This certified programmable assembly is then installed on the job site where the panel 14 has already been installed.

Figure 4B:
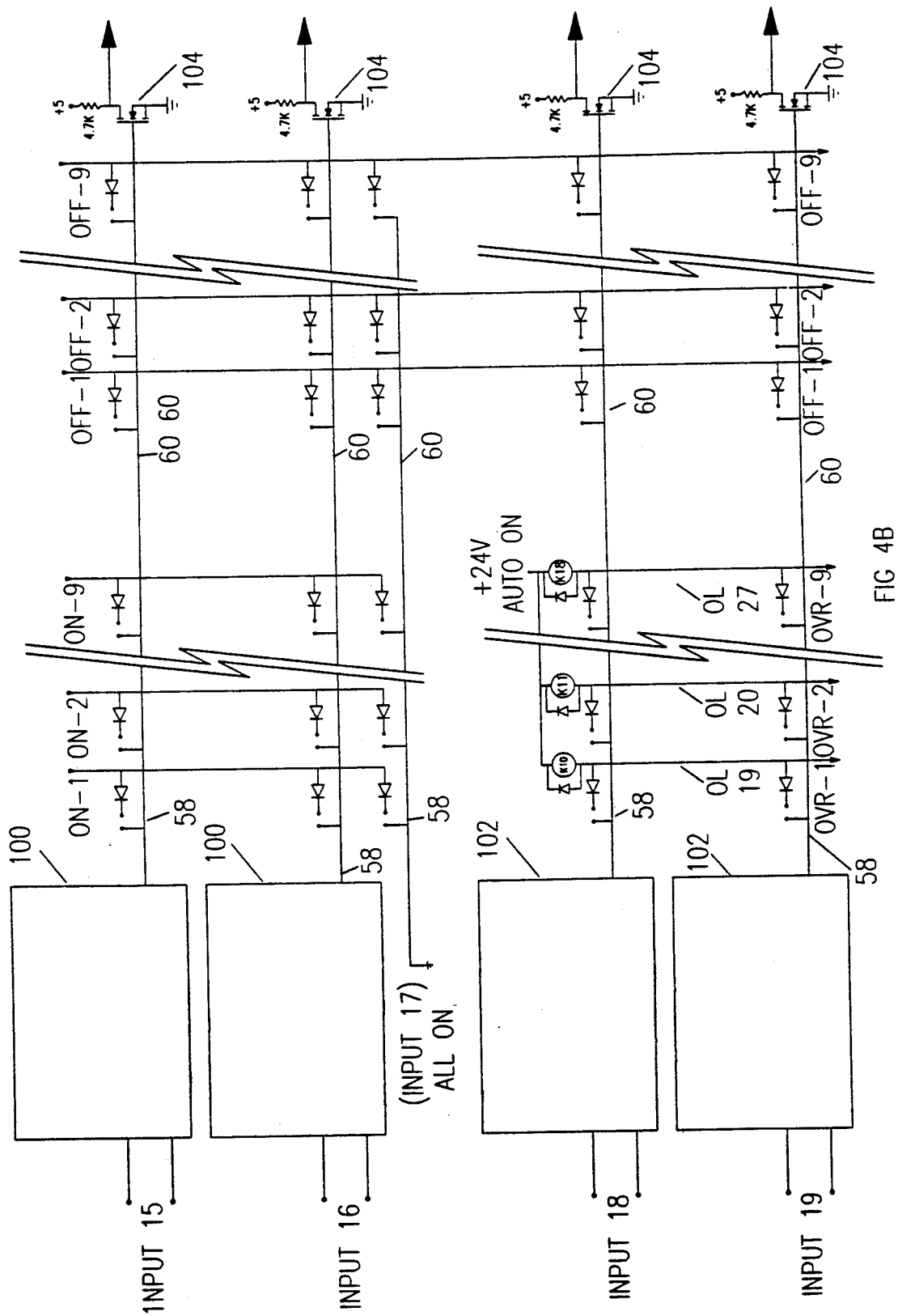

The layout of the matrixes and the lamps is along rectangular coordinates (rows and columns) on switch points on each matrix 10 and 12. All of the rows are connectable to an input line. These input or row lines are indicated at 58 and 60 in FIGS. 1 and 4A, 4B. It will be appreciated that each line 58 is continued at 60 and connected to the switch points of the off matrix. Connections are made also to the output lines, preferably through devices which are polarized to conduct in one direction (diodes), as is shown in FIG. 4A, 4B and 4C. These diodes prevent inadvertent current paths between output lines via the row lines. Each row corresponds to a line of logic. The logic lines and the connections made between the inputs and the outputs as well as the priority of the inputs is readily visible on each logic line by the position of the jumpers in the switch points which make up the logic lines. Therefore, an operating engineer who is responsible for the operation and maintenance of the controlled system (e.g. the HVAC system) is able to see at a glance which controls will be affected and to diagnose where failures might have occurred. Such operating engineers do not need special computer programming skills to understand the logic of the hardware programmable controller.

It may also be desirable, particularly in very large systems, for a digital control computer to be used to develop displays of the status of all inputs and outputs. To this end, it is desirable to provide outputs from each row line and from each output line which effects a control operation (the output lines from the on matrix 10 after they pass through the relay logic 46). These outputs are shown in FIGS. 5 and 6 obtained through circuits including level shifting field effect transistors. The transistor type being selected for purposes of evaluation being type BS 170. These inputs and outputs are then monitored by the digital control computer and displays provided.

FIG. 6 illustrates functionally all 19 inputs and the arrangement of logic lines in the matrixes 10 and 12. The outputs to monitor logic 64 are derived from the output logic 66. This monitor logic may incorporate a multiplexer which sequentially applies the inputs to a communications line or modem which provides the communication with the digital control computer which may be located remotely from the hard wired programmable computer illustrated in FIG. 1.

FIG. 6 shows that the power supply 68 which may be provided by components connected on the board 14, is responsive to 2 24-volt AC (VAC) input lines and has 1 24-volt AC output. This 24-volt AC output may be connected through the 9th output (the contacts K09-2) which are operated by the 9th output line so as to operate a siren, strobe lamp circuit or other master alarm as indicated on the output circuit block 66. The power supply develops 24 volts DC and the other DC voltages for operating the input and output circuits of the programmable controller.

The arrangements shown in FIG. 6 is for twenty inputs and nine outputs. This arrangement is believed sufficient for the large majority of HVAC systems. However, the system may have fewer or greater numbers of inputs and fewer or greater numbers of outputs. Several types of programmable controllers may be made available, each with different complements of inputs and outputs, for example, 10 inputs and 5 outputs, 20 inputs and 9 outputs as shown, or 50 inputs and 20 outputs. An HVAC designer may specify whatever size hard wired programmable controller would be most effective and efficient for the particular system of interest.

Referring to FIG. 4A, 4B and 4C there is shown a typical input circuit which is associated with input 1. This input circuit is designated by the reference numeral 100. It will be appreciated that similar input circuits are associated with inputs 1 through 16. All of these are labeled by reference numeral 100. The input circuits 102 associated with the priority inputs 18, 19 and 20 are similar except that the first and fourth switch points for obtaining latching functions are not provided since they are not necessary for priority inputs. The columns have output lines indicated as output lines 1 through 18. The first 9 output lines 48 extend along the columns of the on matrix. The last 9 output lines 50 from the off-matrix (OL 11 through 18) extend along columns of the off matrix 12. A separate group of output lines OL 19 to OL27 are associated with the priority inputs.

Each of the inputs is connected along a separate row line. These row lines provide separate logic levels and the status of each line is sensed by a level shifting buffer, FET amplifier stage 104, thereby providing TTL levels, for example, to a multiplexer which communicates with a digital control computer for displaying the status of the inputs and outputs of the system.

The switch points are each illustrated by a pair of terminals 110 (only the switch point in the upper left hand corner of the on matrix 10 being labeled to simplify the illustration). One of these terminals is connected to the row line and the other via a stray current blocking diode 112 to an output line. Thus the switch points bridge the intersections of the input or row lines and the output or column lines.

The relay switching logic 46 is contained principally in the circuitry shown in FIG. 5. Operating windings K1 through K18 are connected to the output lines OL 10 through OL 27. The contacts of the relays are indicated in the conventional way by the relay operating winding number and a dash number to indicate each contact operated or pulled in by the associated winding. A normally closed contact is indicated by two parallel lines having a slant line extending between them. Normally open contacts (when the operating winding is not energized or pulled in) are indicated by two parallel lines.

Returning to the input circuits 100, these circuits are in two parts, the part to the left 110 is concerned with switch points 1 through 4 which determine whether the logic is direct or reverse, latching or nonlatching. The other part of the input circuits 112 are concerned with the switch points 5 through 8 and select the annunciation protocol as represented by the color of the LED (whether red, green or amber) for the state of the input.

Consider the input circuit part 110. There are 4 modes of operation. In mode 1, consider the input to be normally closed. The input is actuated or active when it opens. For example, this input may be connected to a low limit switch. Then, jumper 1 is connected for reverse latching operation. When the input is closed, the gate of FET transistor 114 (which conducts when its gate is high) is at a low level (ground); causing the relay KA1 to be deenergized (off). When the input opens, the gate of the transistor 114 goes high through resistor 116 and resistor 118, turning on KA1. Its contact KA1-1 then opens thereby isolating the input from the gate of the FET 114. Then, contact KA1-2 closes which applies low level (the on condition) to the row line. Relay KA2 remains operated (latched) until the reset switch 120 is depressed.

In mode 2, the input is again normally closed and actuation is to the open position. Assume only jumper number 2 is in place. Now the input is directly connected through jumper 2 to the gate of the FET 114 and is not isolated by contact KA1-1. When the input opens, the relay KA1 activates. Then when the input again closes, the relay KA1 will deactivate (deenergize).

In the third mode, consider that the input is normally open and is actuated when closed. Jumper position number 3 (direct nonlatching) is selected. Then when the input goes low, the row line goes low and when the input goes high, the line returns to the high state. This is a normal connection without latching in the third mode.

In the fourth mode, consider that the input is normally open and actuation causes the input to close. Then both jumper positions 3 and 4 are closed. This provides direct logic latching. When the input is open the row line is high. The path from +24 (volts) through a resistor 122 and a light-emitting diode of an opto 124 is broken because both sides of the light-emitting diode of the opto 124 are at +24 volts. Also the FET 114 is off (nonconducting) since its gate is connected through resistor 118 to ground. When the input goes low (the switch connected across the terminals of the input closes) the row line goes low. The diode of the opto 124 conducts. This turns the transistor section of the opto on, causing the gate of the transistor 114 to go high. The relay KA1 then pulls in. The row line is latched to a low condition through contact KA1-2 which then closes. The reset switch 120 must be actuated in order to return the input to its unlatched state.

The annunciator portion 112 of the input circuit utilizes jumper 7 when in use. If jumper 7 is not connected, only LED testing can result. The red test is obtained by applying +24 volts to the red test line. This causes current flow in the reverse direction through the LED causing the LED to illuminate in the red. When the green LED test line is active, it is connected to ground. Then current flows in the normal direction through the LED and it outputs light in the green. It will be appreciated that when the voltage at the cathode of the LED is switched between ground and 24 volts, the direction of current through the LED will switch if the switching rate is at a rate greater than the persistence of vision, the LED will appear to glow in an orange-like or auburn color. This functionality of an LED is used in providing the various annunciation color combinations corresponding to the status of the input. The annunciator circuit 12 includes an opto 128 and two FETs 130 and 132 which may be of the same type as the FET 114. An oscillator, for example, which provides a pulse train from high to low at a 400 Hz rate is connected to the circuit. The line to the oscillator is labeled "TO OSC".

When the jumper 5 is closed, the LED can work in the amber to green or the green to amber mode, since then the train of the FET 130 will switch between +24 volts and ground. When the oscillator is disconnected, the gate of the FET 130 is held low through resistor 134. This allows current to flow through resistor 136, 138 and the LED, causing it to glow red unless the resistor 138 is connected to ground. Jumpers 8 and 6 when connected allow such connection to ground to take place. Jumper 8 connects the transistor of the opto 128 to ground when it is conducting. This causes the LED to glow green when the row line is connected to ground, either through the input or relay contact KA1-2. Then by selecting jumper 5 and jumper 8 the lamp will be either green or auburn, if only jumper 8 is selected. (Of course jumper 7 is always selected when annunciation is required), then the LED will be either red or green.

Either jumper 8 or jumper 6 but not both of those jumpers, are selected at the same time. If jumper 6 is selected, the illumination is the reverse of that which occurs when jumper 8 is selected. When the row line is low or activated, the gait of FET 132 is low causing it to be off so that current flows in the reverse direction, through the LED and it glows red. When the row line is high, the gait of FET 132 is high. This connects the LED resistor 138 to ground and it glows in the green. Thus, by using jumper 6, the normal condition of the LED is green and is switched either to auburn or red depending upon whether the oscillator is connected through jumper contact 5. By knowing the normal or inactive and the activated states of the inputs by selecting jumper 7 and jumpers 5 and 6 or 8 or not 5 and 6 or 8, the desire annunciation illumination sequence can be obtained. This tri-state illumination will readily make the operating engineer cognizant of the status of the inputs to the HVAC system.

Referring to FIG. 5, both the relay logic and the output circuits are shown. Consider first the relay logic. The relay logic operates to change the output relays K01 through K09 in their state (where they are pulled in by energizing operating winding K01 through K09 or allowing the relay to remain dropped out and the windings K01 through K09 deenergize). The windings K01 through K09 are connectable to the inputs and reflect the state of the inputs. Either direct or reverse logic will be asserted if the input is connected to ground. Then K01 in the case of input 1 through input 20 if any of them is at ground and any of the switch points in the first column of the on matrix is closed, will cause the operation of the relay K01. K01 does not operate if the relay K1-1 is not closed. K1-1 is operated when its operating winding K1 is energized through a closed switch contact in any row of the 10th column. Accordingly, if an off matrix contact is high, the output dictated by an input will be inhibited (turned off—therefore the name of the matrix 12 is appropriately the "off" matrix). Priority override is provided by the priority output lines if any of the switch contacts connected to the output line 19 (viz in the 18th, 19th or 20th row) is closed, then relay K10 is pulled in which applies a closed contact simulating an actuated input condition and giving priority to inputs 18 through 20. Off priority is not provided by these inputs 18 through 20.

It will be appreciated that protective diodes are connected across each relay winding to prevent inadvertent operation by reverse currents. A buffer transistor circuit 140 is connected to each of the output lines and reflects the state of the output (whether the relays K01 through K09 are energized or deenergized), these transistors 140 act as buffers to provide TTL levels for monitoring of the outputs by a digital control computer.

There is a separate LED 142 associated with each output and which is energized when the output relay K01-K09 associated therewith pulls in through normally open windings K01-2 through K08-2. Another LED 144 is associated with K09 and does not illuminate unless there is a priority condition.

The outputs may be selected as either direct or reverse logic by selecting either the normally closed or normally open contacts K01-1 to K09-1 of the output relays by jumpers in switch points indicated at 146 and marked direct or reverse. An extra set of contacts (form C contacts 148) is provided for the highest priority relay K09 and voltage for operating a siren, strobe or other serious trouble alarm is preferably connected through this contact set 148.

In the direct mode, the on and off matrixes 10 and 12 solve the following Boolean equations for each logic line (each row of switch points in both matrixes):

$$O_n = (A+B+C+—N)(\overline{ABC}—\overline{N})+1+2+3$$

where:

$$\left.\begin{array}{l}1=\\2=\\3=\end{array}\right\} \text{Priority inputs}$$

where n is the number of said plurality of outputs and N is the number of said inputs, A, B, C —N are the inputs, O is the output for each logic line, there being N logic lines.

Since the input and output circuits of the wired programmable controller all depend upon the two 24-volt AC inputs, a power failure on both inputs will result in inactive outputs, except where reverse logic on the output is selected which may be desirable in cases where pumps must be kept running, for example, to keep circulating coolant or other liquid through chiller or heating coils of an HVAC system.

The circuit shown in FIG. 4 F enables either automatic reinitialize when power returns or manual reinitialize. This circuit includes a relay KB to which the 24-volt power source is connected via a normally open contact of that relay KB-1. Then, if J2 is closed (J2 being a jumper across the autoinitialize switch point 150 (see FIG. 1)), power is connected to the on side labeled "+24 v auto on" automatically when power returns. If J1 or the manual reinitialize switch point 152 also shown in FIG. 1 is selected, then the initialize reset button must be pressed before power can return. Once pressed, the relay KB pulls in and contact KB2 closes so that 24 volts is applied through the J1 jumper to the +24 v auto on output. The contact KB-1 also closes and latches. The KB relay into its operative or pulled in state. Instead of a push button, the initialized reset command can come from a control computer but only after that computer sets the inputs the sequence in which the inputs are to be turned on. If a control computer is not available, then the operator can reset all of the inputs and then turn them on manually. Then all of the motors and power will not be demanded at once by the controlled system and overloads are avoided.

From the foregoing description it will be apparent that there has been provided an improved programmable controller and particularly a hard wired programmable controller which is especially suitable for controlling HVAC systems. Variations and modifications in the herein described system, within the scope of the invention, will undoubtedly suggest themselves to those skilled in the art. Accordingly, the foregoing description should be taken as illustrative and not in a limiting sense.

What is claimed is:

1. Hard wired programmable apparatus for interfacing a plurality of inputs with a plurality of outputs and which comprises first and second matrixes having a plurality of manually connectable switch points which are normally open and selectively and manually closed to program the apparatus, said switch points being arranged in rows and columns, a plurality of first output lines each corresponding to a different one of the columns of said first matrix and connected to the switch points of the column of said first matrix corresponding thereto, a plurality of second output lines each corresponding to a different one of the columns of said second matrix and connected to the column of said second matrix corresponding thereto, each input being connectable to the switch points in a different one of said rows of said first and second matrixes and through said row switch points when closed to the ones of said output lines in the columns of said first and second matrixes to which said closed switch points is connected, and switching means connected to a first group of said output lines corresponding to the first output lines from said first matrix and to a second group of said output lines corresponding to the second output lines from said second matrix for connecting said output lines of said first group to said outputs and thereby connecting those of said inputs which are connected to the closed ones of said switch points of said first matrix to said outputs under control of the ones of said inputs which are connected to said second group of output lines through the closed switch points of said second matrix.

2. The apparatus according to claim 1 wherein each row in each of said matrixes constitutes a logic line, and said switching means includes means operative in accordance with the following Boolean equation for each said logic line $$O = (A+B+C+—N)\overline{(A\ B\ C}—\overline{N})+1+2+3$$

where $$\left.\begin{array}{l}1=\\2=\\3=\end{array}\right\} \text{Priority inputs}$$

where n is the number of said plurality of outputs and N is the number of said inputs, A, B, C —N are the inputs, 0 is the output for each logic line, there being N logic lines.

3. The apparatus according to claim 1 wherein said inputs include at least one priority input, said first matrix having a further row of manually closeable switch points each connectable to said priority input when closed, a plurality of further output lines each connected to a different one of the switch points of said further row, each corresponding to a different one of said outputs, and means in said switching means connected to said further output lines for overriding the control of those of said inputs which are connected to the output lines of said second matrix and controlling said outputs by the priority inputs connected to the switch points in said further row which are closed.

4. The apparatus according to claim 1 wherein said switching means has means which provide control by said second group of output lines through switch points of said second matrix which are closed by inhibiting connection of the inputs which are connected to said outputs through the switch points of said first matrix which are closed and the output lines of said first group.

5. The apparatus according to claim 3 wherein said switching means has means which provide control by said second group of the output lines through switch points of said second matrix which are closed by inhibiting connection of the inputs which are connected to said outputs through the switch points of said first matrix which are closed and the output lines of said first group which are connected thereto, whereby said means in said switching means connected to said further output lines are operative to prevent the inhibiting of said connection of the inputs which are connected to said outputs.

6. The apparatus according to claim 1 wherein said inputs have asserted and nonasserted logic states, and means for selectively reversing the states of said inputs.

7. The apparatus according to claim 1 wherein said outputs have asserted and nonasserted logic states, and means for selectively reversing the states of said outputs.

8. The apparatus according to claim 1 wherein said inputs have asserted and nonasserted logic states, and means for selectively latching said inputs when they assume at least one of their said asserted and nonasserted states.

9. The apparatus according to claim 3 wherein said inputs include a plurality of said priority inputs, said first matrix includes a plurality of further rows of manually closeable switch points each of said further rows corresponding to a different one of said priority inputs, said further output lines each being connected to a different column of the switch points of said further rows.

10. The apparatus according to claim 1 wherein said first and second matrixes each have a further row of manually closeable switch points, each in a different column of their respective matrixes, said output lines being connected to the switch points in the column to which said output lines correspond, a further input connectable through each of said switch points of said further row when closed to said output lines in the columns to which said switch points correspond.

11. The apparatus according to claim 1 wherein said inputs have asserted and nonasserted logic states, annunciator means including for each said input a light emitting diode (LED) which has a first color when current passes therethrough in a first of two opposite directions, a second color when current passes therethrough in a second of said opposite directions and a third color when current therethrough is switched at a rate greater than the rate of persistence of vision between said first and second directions, and means connected to said LED for selection of the change in color between said first and second colors, between said first and third colors and between said second and third colors depending upon the logic state of said input.

12. The apparatus according to claim 6, wherein said reversing means includes circuit means having at least one manually closeable switch point.

13. The apparatus according to claim 7, wherein said reversing means includes circuit means having at least one manually closeable switch point.

14. The apparatus according to claim 8, wherein said latching means includes circuit means having at least one manually closeable switch point.

15. The apparatus according to claim 11, wherein said selection means includes circuit means having at least one manually closeable switch point.

16. The apparatus according to claim 1 further comprising means for operating said switching means from different ones of a plurality of power supplies to provide alternate sources of power in the event of power supply failure.

17. The apparatus according to claim 1 further comprising selectably actuable means for reapplying power automatically or by manual resetting in the event of a power failure.

* * * * *